United States Patent
Hayne

(10) Patent No.: US 6,510,468 B1
(45) Date of Patent: Jan. 21, 2003

(54) ADAPTIVELY TRANSFORMING DATA FROM A FIRST COMPUTER PROGRAM FOR USE IN A SECOND COMPUTER PROGRAM

(75) Inventor: Mark N. Hayne, San Jose, CA (US)

(73) Assignee: Micro Focus International Limited (KY)

( * ) Notice: Subject to any disclaimer, the term of this patent is extended or adjusted under 35 U.S.C. 154(b) by 0 days.

(21) Appl. No.: 09/235,939

(22) Filed: Jan. 22, 1999

(51) Int. Cl.⁷ .............................. G06F 9/44; G06F 15/16
(52) U.S. Cl. ...................................... 709/246; 707/501.1
(58) Field of Search .......................... 709/246; 707/101, 707/501.1, 513

(56) References Cited

U.S. PATENT DOCUMENTS

| | | | |
|---|---|---|---|
| 5,228,137 A | | 7/1993 | Kleinerman et al. ......... 395/500 |
| 5,960,200 A | * | 9/1999 | Eager et al. .................. 703/13 |
| 6,067,414 A | * | 5/2000 | Wang et al. ................. 707/100 |
| 6,182,276 B1 | * | 1/2001 | Brawn et al. ................ 717/109 |
| 6,256,676 B1 | * | 7/2001 | Taylor et al. ............... 709/246 |

OTHER PUBLICATIONS

Law et al. "Web–enabling legacy applications", Parallel and Distributed Systems, IEEE proceeding 1998. pp. 218–225.*
Abowd et al. "MORALE. Mission Oriented Architectural Legacy Evolution", Software Maintenance, IEEE proceedings 1997, pp. 150–159.*
Sneed, H.M. "Encapsulating legacy software for use in client/server systems", Reverse Engineering, IEEE proceedings 1996, pp. 104–119.*
ORBexpress Realtime; Introducing ORBexpress for Ada 95; Objective Interface Systems, Inc.; 3 pages.

* cited by examiner

*Primary Examiner*—Dung C. Dinh
(74) *Attorney, Agent, or Firm*—Blakely Sokoloff Taylor & Zafman

(57) ABSTRACT

A system for transforming a mainframe application into corresponding web-based application is disclosed. A set of logic rules and data are extracted from the mainframe application. Link objects containing the set of logic rules and data are created. The link objects point to the rules and data in the mainframe application. The link objects are mapped to display regions defined by web-based application. Web pages are created to display the transformed mainframe application and a web-browser is used to display and navigate among the data in the mainframe application.

3 Claims, 16 Drawing Sheets

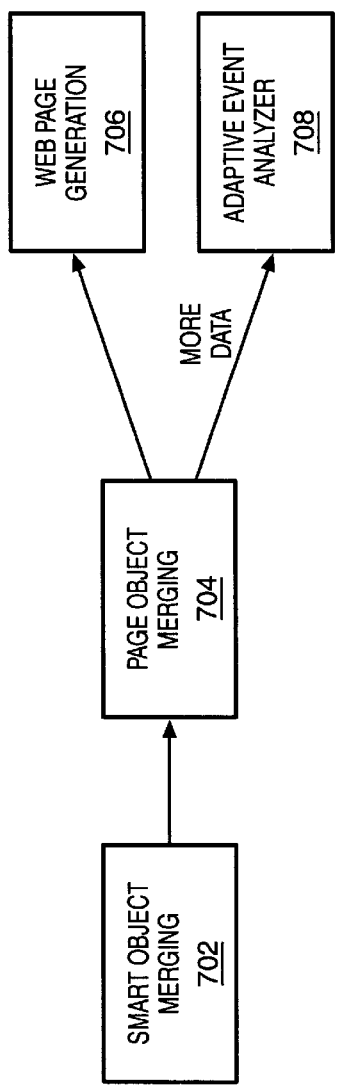
FIG. 7A *ONE-TO-ONE SYNTHESIS*
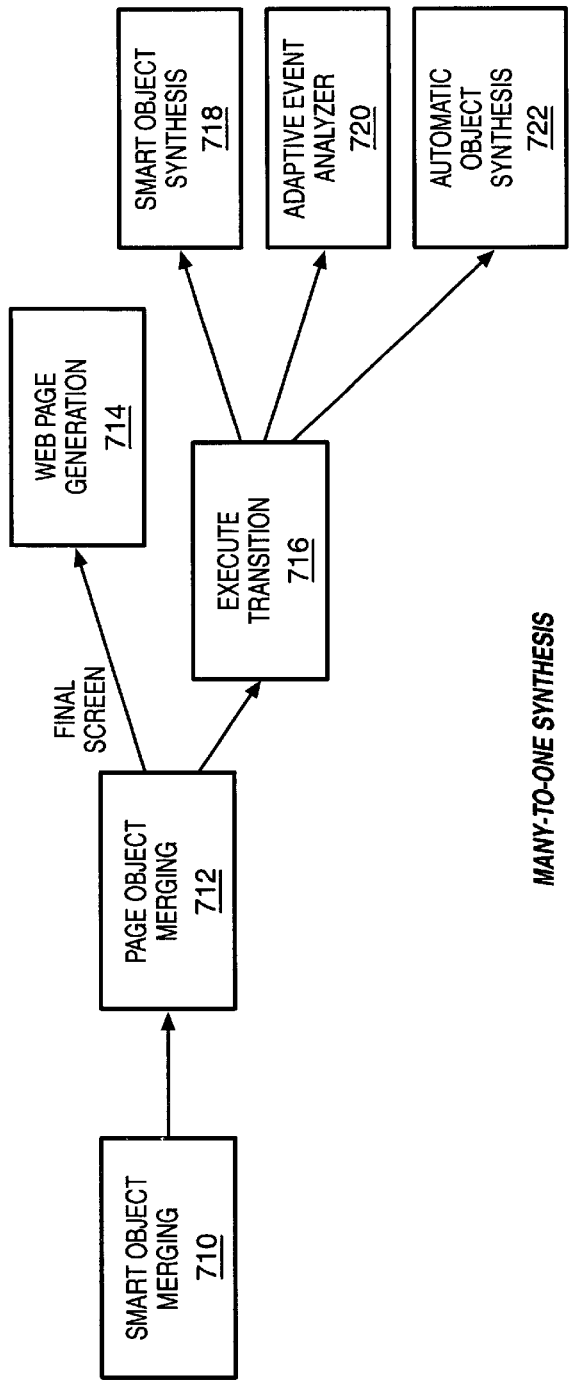
FIG. 7B *MANY-TO-ONE SYNTHESIS*

HYPERLINK OBJECT SYNTHESIS

DATA TABLE SYNTHESIS

```
                          Vendor Inquiry                       039 / FSR4039D Vendor..: PC WARE Name....:  PC WAREHOUSE               Short name..: PCWAREHOUS
 Address 1: 536 FOLSOM STREET          Phone.......: 00000000000
 Address 2:                            Telex.......:
 Address 3:                            Postal code.: 94107
 City....: SAN FRANCISCO   State..: CA FOB cd......:
 Ctry cd/nm: USA / UNITED STATES       FOB desc:  NONE SPECIFIED
                                       ERS?..: N    Type.: P
                                                    Status:

Vendor Inquiry                       039 / FSR4039E

Vendor..........: PC WARE
 Short name......: PCWAREHOUS

Actual MTD amt..:   $39,960.00    Std MTD amount: $9,999,999,999,999.99   ted.: 12/23/96
 Disc available..:        $.00    Disc taken....:                  $.00   disc:
 Pending credits.:        $.00    Invoice limit.: $9,999,999,999,999.99   nbr:
 YTD amount......:   $39,960.00    Prior YTD amt.:                 $.00
 YTD invoices....:                 Prior YTD inv.:
 Statistics?.....: N
 VAT category....:                 GST rt cat/GST tax id:
 Tax ID/type.....:                 1099 code....:
 1099 withhold?..: N
 1099 Totals
   To dt w/hld...:         $.00    Prior w/hld...:          $.00
   Cat 1 amt.....:         $.00    Cat 2 amt.....:          $.00
   Cat 3 amt.....:         $.00    Cat 5 amt.....:          $.00
   Cat 6 amt.....:         $.00    Cat 7 amt.....:          $.00
   Cat 8 amt.....:         $.00
 MORE DATA AVAILABLE
 Next transaction   039   Security         Status: WARNING     SC / SCON
 F1=Help    F2=Next txn   F3=Exit    F4=Prompt    F5=Hold txn    F6=Change sys
 F7=        F8=           F9=        F10=         F11=           F12=Main menu
```

*FIG. 11*

ADAPTIVELY TRANSFORMING DATA FROM A FIRST COMPUTER PROGRAM FOR USE IN A SECOND COMPUTER PROGRAM

FIELD OF THE INVENTION

The present invention relates generally to the field of computer networks, and more particularly to transforming traditional computer applications into corresponding web-based applications.

BACKGROUND OF THE INVENTION

Most business databases are large, complex programs that are stored on a central server computer and maintained by dedicated database administrators. As business operations become more complex, and the amount and type of data becomes greater and more varied, creation and administration of databases becomes a greater responsibility for a business organization.

With the advent of large area networks and distributed database applications, many business organizations are starting to make mainframe-based applications available through the Internet and corporate intranets. Although some organizations have taken the approach of migrating all of their information assets to PC-based client/server solutions, others have chosen not to do so.

One of the main reasons that businesses choose not to migrate to PC-based client/server systems is that most of the core business applications and critical enterprise data in business organizations, including vast amounts of historical data, continue to reside on traditional computer applications that often involve terminal-based mainframe computers. Mainframes are secure and available, even when operating at full capacity. The core business logic that they hold would be prohibitively expensive and require vast amounts of time and application development resources to replace.

However, a compelling reason to migrate to the client/server system is that accessing these mainframe applications through the Internet introduces the opportunity to make any and/or all of an organization's information assets available to a broader range of users. It is often advantageous to make previously internal-use-only mission-critical applications available to customers, suppliers, strategic partners and prospective customers. However, it is of paramount importance to use appropriate security measures so that such information can be provided without sacrificing security and access control.

The challenge to make more information available through the Internet applies not only to mainframe based applications, but existing distributed computing environments as well as Internet based information resources. A common delivery vehicle that embraces these discrete islands of information for web enablement and delivery is crucial.

Recently, two main approaches to web-based development have emerged. The first is referred to as passive application delivery, in which information from terminal emulators is taken and re-displayed in web page format. Such applications are commonly referred to as "screenscrapers". Screenscrapers and host-based web servers simply re-display in a more attractive interface, the same information found on the mainframe system. These tools are low cost and offer an organization the benefit of fast time-to-market for developing a presence on the web, but they provide no opportunity for an organization to change the business processes reflected in the mainframe applications.

The second approach is referred to as application redevelopment. Application redevelopment tools provide an organization with the benefit of total flexibility, enabling the business processes to be re-engineered. However, this approach generally requires massive amounts of time and preordaining resources. During this long development phase, an organization may see its competitors develop their own web presence, customize their services, and begin to reach out to new markets while its own code-intensive re-development efforts are still in process.

Thus, the disadvantages associated with these first-generation tools for moving mainframe data to the web include lack of flexibility and efficiency, or the requirement for great amounts of computing resources and time to transform mainframe applications to web-based applications.

SUMMARY OF THE INVENTION

The present invention discloses a system for providing an adaptive transformation from a mainframe application to corresponding web-based applications. In a method of the invention, a set of logic rules and data are extracted from the mainframe application. Link objects containing the set of logic rules and data are created. The link objects point to the rules and data in the mainframe application. The link objects are mapped to display regions defined by the web-based application. Web pages are created to display the transformed mainframe application and a web-browser is used to display and navigate among the data in the mainframe application. The mechanism is adaptive in that should the mainframe application or its data change, the web page is modified accordingly without further definition of the link objects. Further, enhanced web browsers or Internet clients are supported without redefinition of the link objects.

BRIEF DESCRIPTION OF THE DRAWINGS

The present invention is illustrated by way of example and not limitation in the figures of the accompanying drawings, in which like references indicate similar elements, and in which:

FIG. 7A is a state diagram that illustrates the state transitions of the smart object synthesis function for one-to-one page object synthesis, according to one embodiment of the present invention.

FIG. 7B is a state diagram that illustrates the state transitions of the smart object synthesis function for many-to-one page object synthesis, according to one embodiment of the present invention.

FIG. 11 illustrates example host screens and their associated sequences, business rules and data.

DETAILED DESCRIPTION

Figure 1:
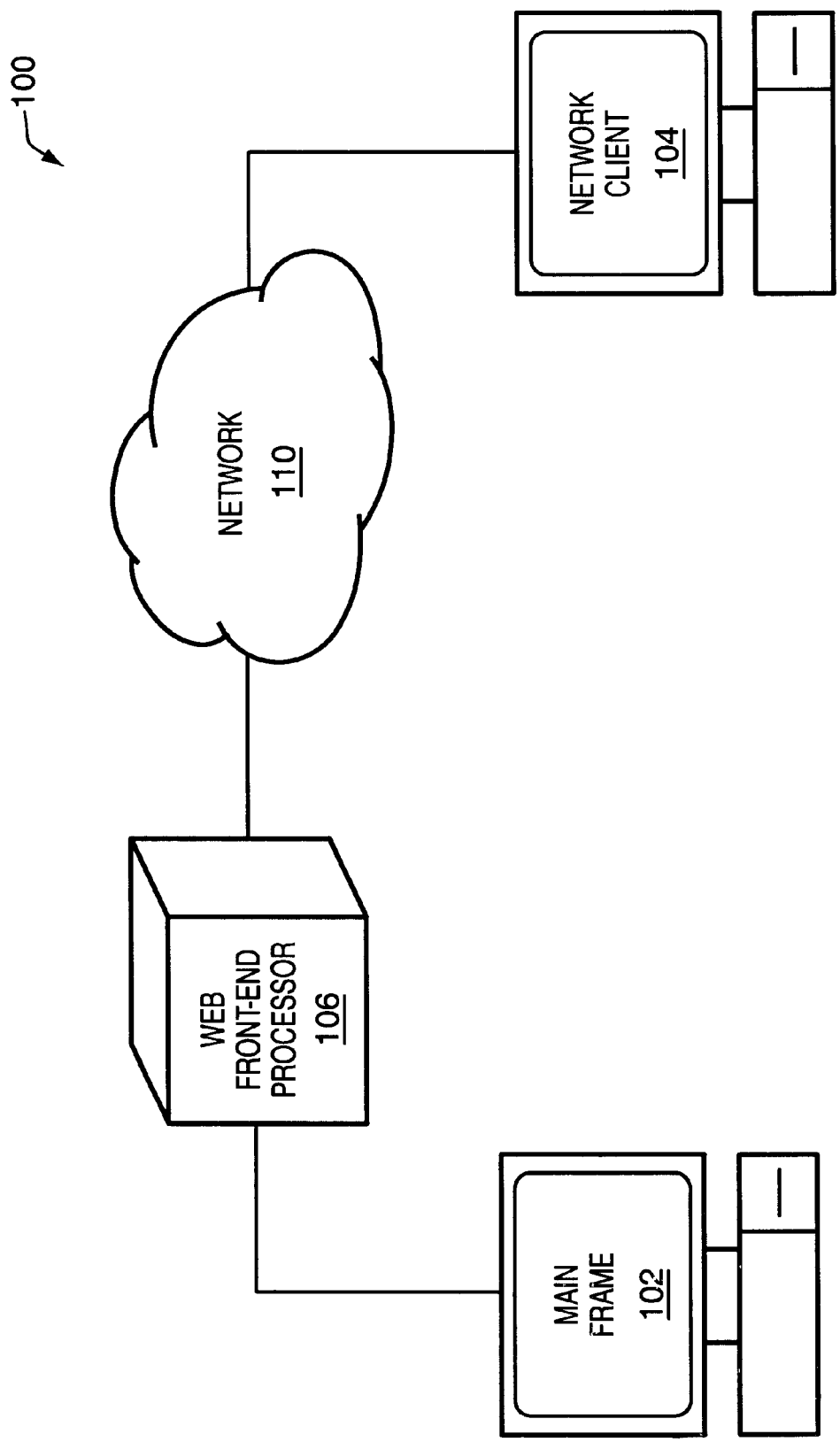
FIG. 1 illustrates a network including client/server computers that transmit and receive data in accordance with one embodiment of the present invention.

A system for transforming mainframe computer applications to web-based applications is disclosed. A suite of programming tools facilitates web-enabled information delivery, without the application redevelopment effort required by more traditional approaches. The transformed applications feature improved display, flexible navigational flow, and improved control over application content.

It is an intended advantage of embodiments of the invention to control the delivery of enterprise applications across the Internet for various different users in a cost-efficient manner.

It is a further intended advantage of embodiments of the invention to provide improved display, navigation, and content control of information in mainframe applications through transformation of such applications into web-based applications accessible through standard web-browser programs.

It is a further intended advantage of embodiments of the invention to synthesize and manage the information in mainframe applications for simplified delivery to downstream Internet applications implemented in, for example, enterprise applications and message-based applications.

Hardware Overview

According to the present invention, client computer systems in a network request and receive documents or database files comprising data or object descriptors. According to one embodiment of the present invention, the steps of transmitting and displaying the document or data, as well as other aspects of the present invention are implemented by a central processing unit (CPU) in a client or server computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the client computer from a storage device or from one or more other computer systems over a network connection. For example, a server computer may transmit a sequence of instructions to the client computer in response to a message transmitted to the server over a network by the client. As the client receives the instructions over the network connection, the client stores the instructions in memory. The client may store the instructions for later execution or execute the instructions as they arrive over the network connection. In some cases, the downloaded instructions may be directly supported by the CPU. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU. In other embodiments, hardwired circuitry may be used in place of, or in combination with, software instructions to implement the present invention. Thus, the present invention is not limited to any specific combination of hardware circuitry and software, nor to any particular source for the instructions executed by the client computer.

FIG. 1 illustrates a system 100 in which data files are transmitted between networked computers. Client computer 104 is coupled to a mainframe computer 102 through network 110. Network 110 may be the Internet, a Wide Area Network (WAN), a Local Area Network (LAN), or any combination thereof. Mainframe computer 102 contains application programs and/or data which are accessible over the network by other network stations or directly-attached (non-network) terminals. As used with embodiments of the present invention, mainframe computer 102 typically stores so-called "enterprise" data, which is proprietary data that is used to run a business. Such enterprise data is created through the use of enterprise applications that are the set of business applications that a business organization utilizes in the course of its normal activities. Many enterprise applications are proprietary programs that are either written by the organization or customized to fit the individual needs of the organization. Typical enterprise applications include large database programs that create and store data used by the organization. In general, enterprise applications, by their nature, are limited to access by the enterprise's terminals or through application programming interfaces (API).

In one embodiment of the present invention, network client 104 is a World-Wide Web (WWW or "web") client that receives and stores data in the form of 'web pages' produced as Hypertext Markup Language (HTML) files and transmitted over the Internet network 110. To access these files, network client 104 runs a 'web browser', which is simply an application program for accessing and providing links to web pages available on various Internet sites. Network client 104 may also implement a downstream Internet client such as a CORBA-complaint application, Java™, or Java-Bean™ program. Such applications receive data through the Internet Inter-ORB Protocol (IIOP). Java and Java-Bean are trademarks of Sun Microsystems, Inc.

In one embodiment of the present invention, system 100 includes a web front-end processor (FEP) 106. Web FEP 106 executes a run-time application that delivers mainframe applications from mainframe computer 102 to network client 104. On web FEP 106, all web-specific processing for network client 104 is performed so that no additional processing burden is placed on mainframe computer 102.

In one embodiment of the present invention, system 100 generates HTML files for delivery over Internet network 110 to network client 104 such that no additional processing other than that normally performed by web clients is required on the client. System 100 may also generate IIOP or other standard communication protocols designed for computer-to-computer information interchange. System 100 assembles and simplifies the enterprise data so that IIOP programs can view it.

Figure 2:
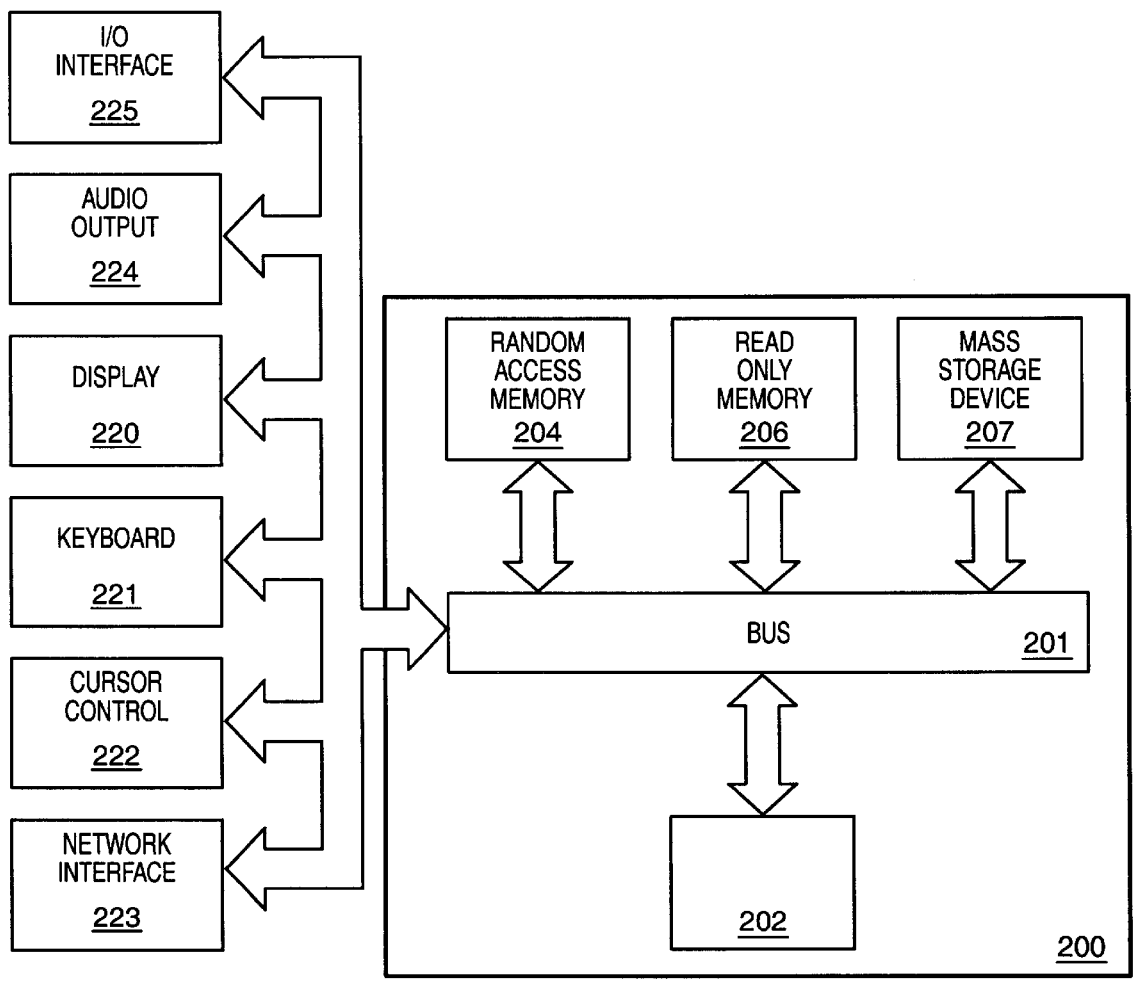
FIG. 2 is a block diagram of a client computer system that implements a web browser or downstream Internet client, according to one embodiment of the present invention.

FIG. 2 illustrates a block diagram of a representative client computer such as network client 104 illustrated in system 100 of FIG. 1. The computer system 200 includes a processor 202 coupled through a bus 201 to a random access memory (RAM) 204, a read only memory (ROM) 206, and a mass storage device 207. Mass storage device 207 could be a disk or tape drive for storing data and instructions. A display device 220 for providing visual output is also coupled to processor 202 through bus 201. Keyboard 221 is coupled to bus 201 for communicating information and command selections to processor 202. Another type of user input device is cursor control unit 222, which may be a device such as a mouse or trackball, for communicating direction commands which control cursor movement on display 220. Also coupled to processor 202 through bus 201 is an audio output port 224 for connection to speakers which output the audio content produced by computer 200. Further coupled to processor 202 through bus 201 is an input/output (I/O) interface 225 which can be used to control and transfer data to electronic devices connected to computer 200.

Network interface device 223 is coupled to bus 201 and provides a physical and logical connection between computer system 200 and the network medium. Depending on the network environment in which computer 200 is used, this connection is typically to a server computer, but it can also be to network router or another client computer. Note that the architecture of FIG. 2 is provided only for purposes of illustration, and that a client computer used in conjunction with the present invention is not limited to this specific architecture.

In one embodiment of the present invention, network client 104 is a personal computer that interfaces to network 110 through a modem, or similar network interface device. In an alternative embodiment, the network client 104 represented by computer system 200 may be a dedicated Internet access product, such as a Network Computer (NC). In another alternative embodiment, network client 104 may be a computer running a CORBA-complaint Internet application or a Java, Java-Bean, or enterprise Java-Bean Internet application.

SmartTran Network Architecture

In one embodiment of the present invention, a set of non-programmatic tools is provided to transform mainframe applications residing on mainframe computer 102 to web-based applications for access by network client 104. The present invention is included in a software program known as SmartTran™, which provides web-enabled information delivery of data stored in mainframe computer 102 without the need for re-programming this information. SmartTran is a trademark of Micro Focus (US), Inc.

SmartTran transforms information that lies dispersed throughout an organization into a seamlessly integrated information delivery system. SmartTran links mainframes, distributed computing resources and web-based client computers. The SmartTran suite implements an object-based approach to creating web-delivered applications. SmartTran allows web authors to easily create components called SmartLinks™ via a simple graphical user interface. Smart-Links is a trademark of Micro Focus (US), Inc. SmartLinks are mainframe data elements and procedures that have been transformed into components by the SmartTran system. These web objects, or components, can be created from a variety of data elements such as a logic field or data field on a mainframe screen, or a processing procedure. When deployed in web-enabled applications, SmartLinks function as intelligent hyper-links to the original data, logic or mainframe screens. In this manner, SmartLinks can be used to provide precise control over the delivery of the data. SmartLinks representing data elements from multiple host screens can be mapped to one Web page, and individual data elements represented as SmartLinks can be selectively mapped to one web page.

Once these SmartLinks are created, they can be flexibly combined based on how a user desires to send information to the web. Developers can also combine SmartLinks with other components, such as Java or ActiveX applets, or HTML scripts to extend their capabilities. Similarly, RDBMS or client/server data components can also be combined.

Figure 3:
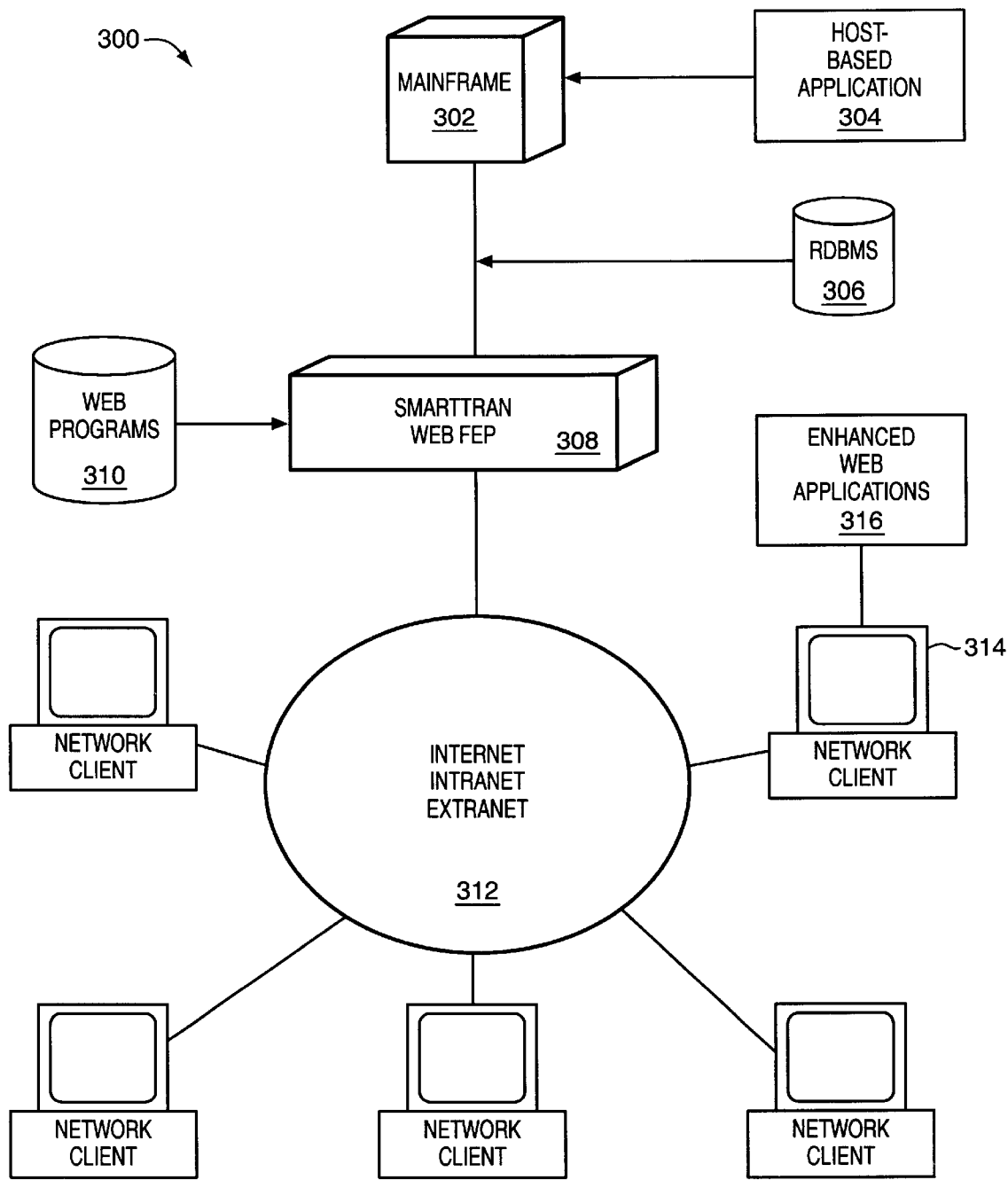
FIG. 3 is a block diagram of a network that contains a SmartTran front-end processor, according to one embodiment of the present invention.

FIG. 3 is a block diagram of the network that contains a SmartTran front-end processor according to one embodiment of the present invention. Network 300 of FIG. 3 is a more detailed representation of network 100 illustrated in FIG. 1. Mainframe computer 302 contains the enterprise applications and data that are to be transformed into web-based applications for distribution and access over network 312. Network 312 can be the Internet, a corporate internal network (intranet) or an external network (extranet). Coupled to network 312 are a number of network clients of which network client 314 is a representative unit.

Various host-based applications 304 are executed on mainframe 302. Mainframe 302 also accesses one or more relational database management system (RDBMS) programs. Mainframe 302 is coupled to one or more SmartTran web front-end processors (FEPs) 308 using standard mainframe networking techniques such as, but not limited to, IBM System Network Architecture (SNA) Logical Unit type 2 (LU2), token-ring or direct attached channel connections (ESCON or OEMI channel). Mainframe 302 can connect to FEP 308 via existing wide-area networking techniques, such as TCP/IP networks. The web front-end processor transforms the host-based applications 304 and database applications 306 into web enabled applications to be accessed by web browsers running on network clients such as network client 314. Web-specific development tools and programs 310, such as Java, ActiveX, and Visual Basic are made available to the web front-end processor 308. These allow the addition of web extensions and the integration of external data sources to the host-based applications. The resulting enhanced web applications 316 are accessed by network client 314 executing a web browser program. The finished web page provides a web interface into the existing host application and its associated business rules and logic, resulting in dynamic web delivery of the host application.

SmartTran Program

Figure 4:
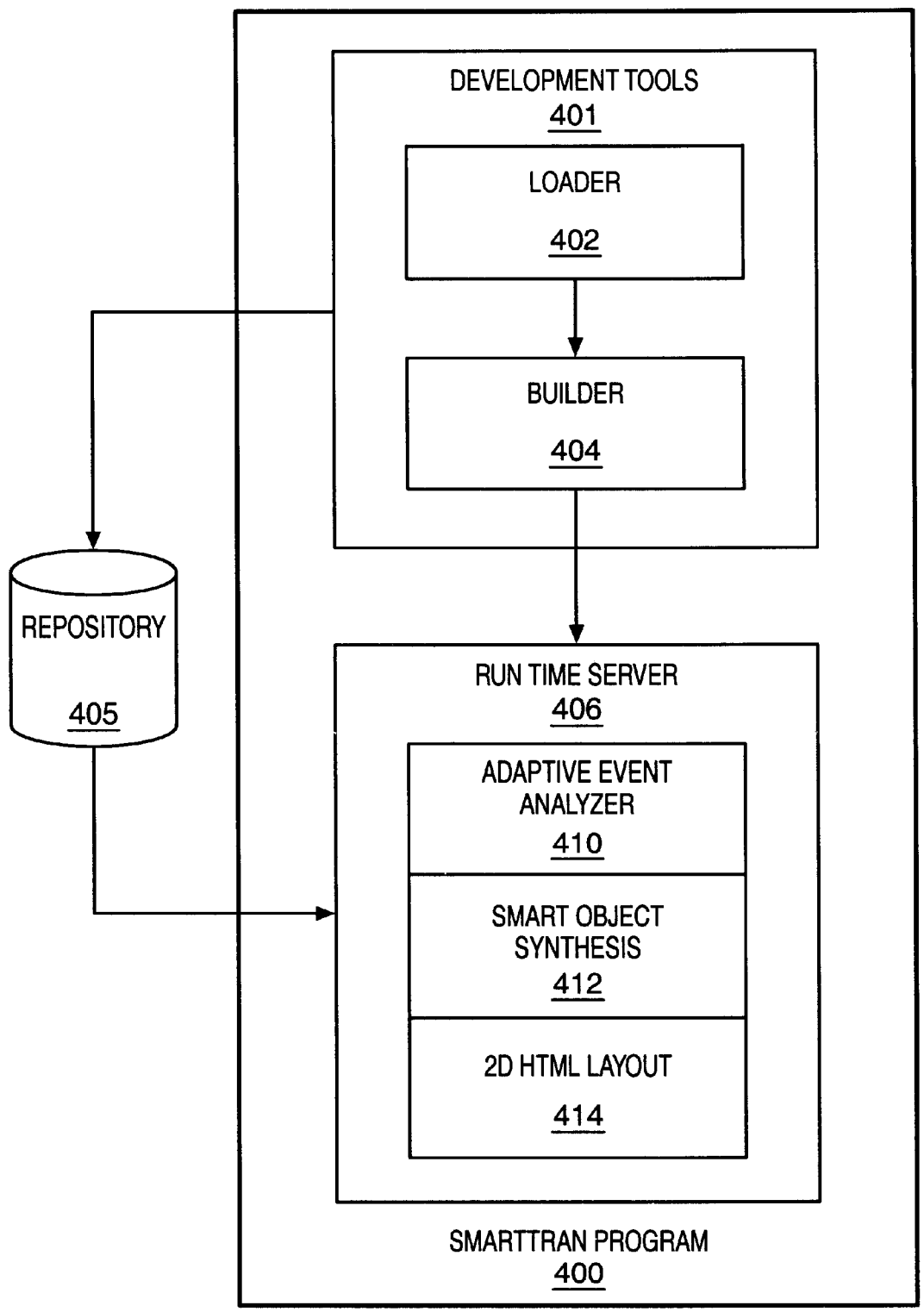
FIG. 4 is a block diagram that illustrates the main components of the SmartTran program, according to one embodiment of the present invention.

In one embodiment of the present invention, the SmartTran program consists of a suite of graphical tools and run-time systems that support each stage of the Internet development and deployment process. FIG. 4 is a block diagram that illustrates the main components of the SmartTran program, according to one embodiment of the present invention. The main components include a loader 402, a builder 404, and a run-time server 406. The SmartTran loader 402 creates SmartLink components from mainframe applications, the SmartTran builder 404 acts as a component integration/authoring tool, and the SmartTran run-time server 406 interprets the rules and smartlinks in generating web-client output. The run-time server 406 manages multiple, concurrent sessions between the mainframe application and web clients.

The loader component 402 and builder component 404 are contained in a development tool suite 401. The development suite 401 stores its information in a repository, 405. The repository 405 embodies the development process storing the smartlink definitions. The run-time server 406 interprets these rules during the translation process. The development tools 401 transform the data and objects comprising the host application into components that can be processed by the run-time server 406. SmartTran loader 402 provides a window into the host (mainframe) application and allows extraction of business rules, database schemes, and printed-page layouts. This review process creates SmartLinks that contain the selected host business rules and data.

SmartTran builder 404 provides a drag-and-drop interface that lets a web author manipulate SmartLink components. The builder program maps SmartLink components to templates that become the underlying foundation for the new web-enabled application. Using SmartLinks, the web author can embed hyperlinks which will allow the web user to navigate to different parts of the host application without having to sequentially process through the host application screens. This hyperlinking capability allows much easier navigation through an application. It also allows the ability to use the backward, forward, and bookmarking capabilities of common web browsers in the context of the mainframe application. In this manner, the hyperlinking and web browser controls provide an ability to redefine how a user navigates through an application.

In one embodiment of the present invention, the SmartTran templates that result from this process can be viewed by any industry-standard web browser, and can also be exported to any of the major Web authoring tools. The SmartTran builder also extends the mainframe environment by integrating SmartLink components with other external components. Such components include relational database management systems, static HTML, Java applets or ActiveX components, and business rules residing in client/server applications such as Visual Basic, among other such components.

SmartTran server 406 is a run-time application tool that is implemented in web-to-mainframe front-end processor 106. All run-time processing within SmartTran is performed by the web front-end processors. In one embodiment of the present invention, the web front-end processors communicate with the mainframe through TN3270 or SNA connections, attaching directly as channel-based devices to ensure optimal throughput. The SmartTran server 406 can add incremental web front-end processors transparently, providing availability to additional users without disrupting service to existing users. Application processing is also automatically load-balanced across multiple SmartTran Web front-end processors, ensuring optimum performance. Automatic failover ensures high availability of mission critical information. In one embodiment, the SmartTran program is configured to support standard mainframe security processes, such as RACF, ACF2, and TopSecret, as well as standard web security features.

In one embodiment of the present invention, run-time server 406 contains three separate processes that create the web-based version of a host application. These processes include an adaptive event analyzer process 410, a smart object synthesis process 412, and a two-dimensional HTML layout process 414. Detailed composition and function of each of these processes will be provided in the sections to follow.

Figure 5:
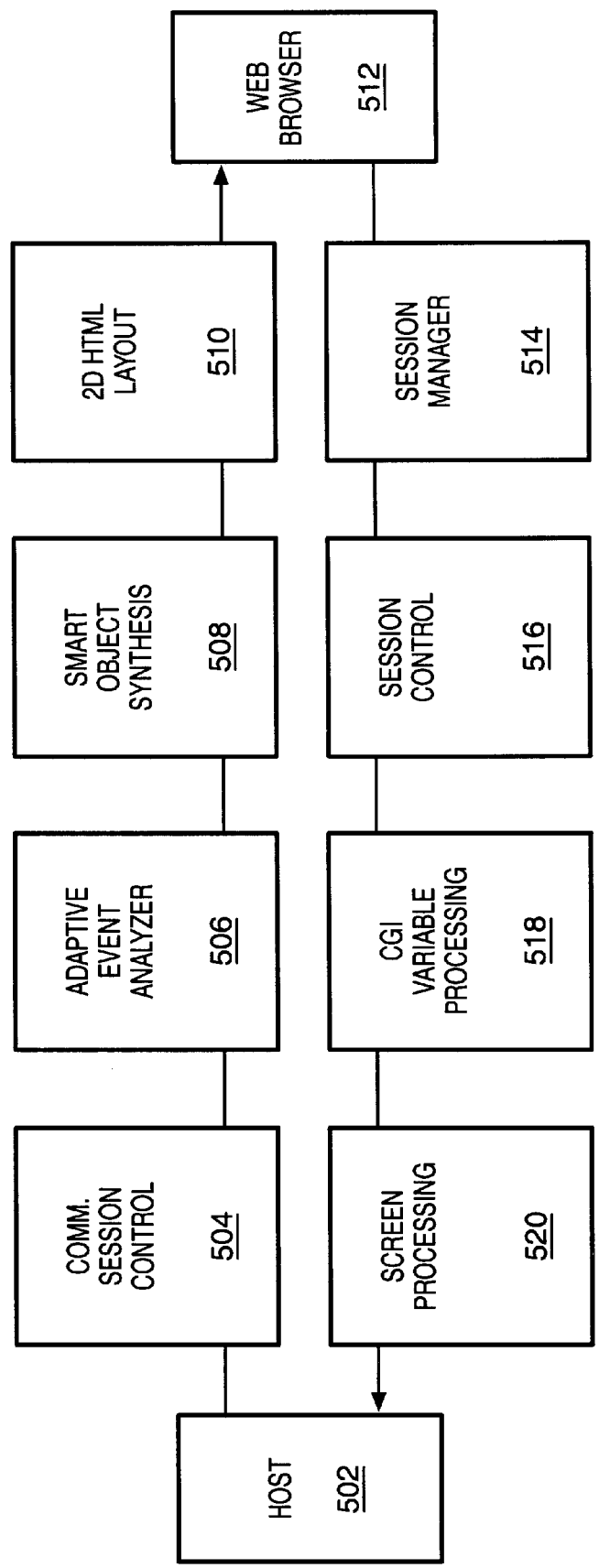
FIG. 5 is a block diagram of a service flow between a host application and a corresponding web-based client application, according to one embodiment of the present invention.

FIG. 5 is a block diagram of a service flow between a host application and a corresponding web-based client application, according to one embodiment of the present invention. Host 502, which is typically a mainframe computer, such as mainframe 302 in FIG. 3 contains one or more host applications that are to be transformed into corresponding web-based applications for access by web browser 512 that is resident on a network client, such as network client 314. The host application is processed through a suite of transformation processes and session managers to produce a corresponding web-based application. In one embodiment of the present invention, the suite of transformation processes is executed by a web-based front-end processor, such as web FEP 308 in FIG. 3.

In one embodiment of the present invention, communication between a host computer (mainframe) and a network client (web client) using the SmartTran system is bi-directional. Mainframe applications are converted to web-based programs for access by the web client, and changes made to data through the web browser are recorded and take effect on the data stored in the mainframe. FIG. 5 illustrates the bi-directional service flow between a host computer and web client in the SmartTran system, according to one embodiment of the present invention.

In the SmartTran program service flow 500 illustrated in FIG. 5, the host 402 communicates with web browser 512 through a communication session control 504 and through the three main web FEP run-time processes. These run-time processes include adaptive event analyzer process 506, smart object synthesis process 508, and two-dimensional HTML layout process 510. The web browser 512, in turn communicates to host 502 through session manager 514, session control 516, CGI variable processing process 518, and screen processing process 520.

Adaptive Event Analyzer

In one embodiment of the present invention, the SmartTran program includes an adaptive event analyzer that interprets user defined web page templates. The adaptive event analyzer first identifies the current mainframe application state by examining the data stream using the process described below. Host application screens are generally represented in data streams. A data stream may be a screen containing information or objects needed to construct requested web page, or it may be a transition screen between two screens that is needed to construct requested web page. A data stream may also be defined as an out of sequence screen or an exception screen. An application's screen or message buffer is unknown a priori to receipt. SmartTran must thus be event driven and identify the screens as they arrive to the adaptive event analyzer. The SmartTran program analyzes an incoming data stream and matches screens to determine states of transition.

In one embodiment of the present invention, the adaptive event analyzer matches a data stream to a screen of a transition path which may lead to the construction of its corresponding dynamic web page. Since a screen of a transition path may change during run-time, a matching algorithm is used to recognize changes and match a screen into a transition path. In one embodiment of the present invention, the matching algorithm uses a three-tier matching algorithm to identify a screen. The three match levels include a perfect match, a percentage match for screens that have been recently visited by the application, and a percentage match based upon all possible transition screens from a previous screen.

In one embodiment of the present invention, the Smart-Tran program describes a host screen based on the 3270 Start Field (SF) orders in its data stream. The SF order indicates the start of a field (protected or unprotected) in a screen buffer. In another embodiment of the invention, input data from applications are identified by message fields in a message buffer. In a further embodiment of the invention, input data from object-oriented applications, such as CORBA-complaint or Java-based, are identified by their field parameters in an IIOP message. In all cases, fields have an address used to calculate a hash number.

The matching algorithm uses a hash number for the screen or application data to determine the possible match values. A screen's hash number is used to quickly and efficiently retrieve a screen template definition from the repository. A host screen's hash number is calculated from the following formula:

$$shn = \sum_{i=1}^{n} (i * address_i^2)$$

In the above equation, shn is defines as a host screen's hash number, i is a Start Field's sequence number, n is the total number of Start Fields, and address is a Start Field's buffer location. In general, the screen hash number cannot uniquely identify host screens, instead it is used to classify screens so that relevant screens can be retrieved effectively during the run-time.

In one embodiment of the present invention, the matching algorithm defines various levels of match values. For example screens are ranked in three match levels denoted, first match, secondary match, and tertiary match. The first match level, in which two screens layouts are substantially identical, is referred to as a "perfect match". Two host screens' layouts are considered to be substantially identical if the Start Field's address in one screen matches the Start Field's address in the other screen. For example, a run-time host screen has three Start Fields with the location information of 120, 860, and 1900, and there is a host screen in the SmartTran repository that has three Start Fields with the addresses of 120, 860, and 1900. In this case, the two screens are considered to be the same, and would register as a match.

Although there could be duplicated screen hash numbers in a SmartTran repository, each screen in the repository must be unique. At run-time, two steps are used to find a desired screen. First, a screen hash number is used to retrieve the screens using the run-time screen hash number. Second, an iteration process through the retrieved screens is performed to find the matched screen.

The second match level, in which two screens' layouts are similar, is referred to as a "secondary match". Although two screens are not the same, they might still be considered similar if their matching ratio (similarity) exceeds a tunable threshold, referred to as a "secondary matching ratio". A screen's matching ratio is calculated based on the percentage of the matched Start Fields in the compared screens. For example, a run-time screen has Start Fields at 100, 860, 1200, and 1900, and there is a host screen in the repository that has its Start Fields at 100, 860, and 1900. The matching ratio between the screens is 0.75 based on a match of three screens to four screens ($r=3/4$).

A secondary match is attempted when no primary matched screen can be found in the repository. The Smart-Tran program first attempts to find screens that have a matching ratio with the run-time screen exceeding the secondary matching ratio. If there are multiple qualified screens, the screen with the highest matching ratio is selected.

The third match level is referred to as a "tertiary match". In the case of a failed primary match and failed secondary match, the desired screen is selected based on the transitional information of the screen which is matched by the previous run-time screen. A transition is defined to be, in part, the likely pairing of screens or application data buffers (messages or objects) such that one naturally transitions to another. For example, screen B may follow screen A in a typical usage of the mainframe application. In a less typical use, screen C may also follow A. Two transitions, from A to B and from A to C, are thus recorded in the repository.

If the previous matched screen has transitions and if there are screens being transitioned to that have matching ratios with the run-time screen exceeding another tunable threshold, referred to as a "tertiary matching ratio", the screens are considered to be similar to the run-time screen. The screen with the highest matching ratio will be selected. Since the search of the tertiary match is based on the previous matched screen, the tunable tertiary ratio is generally lower than the ratio for the secondary match.

Figure 6:
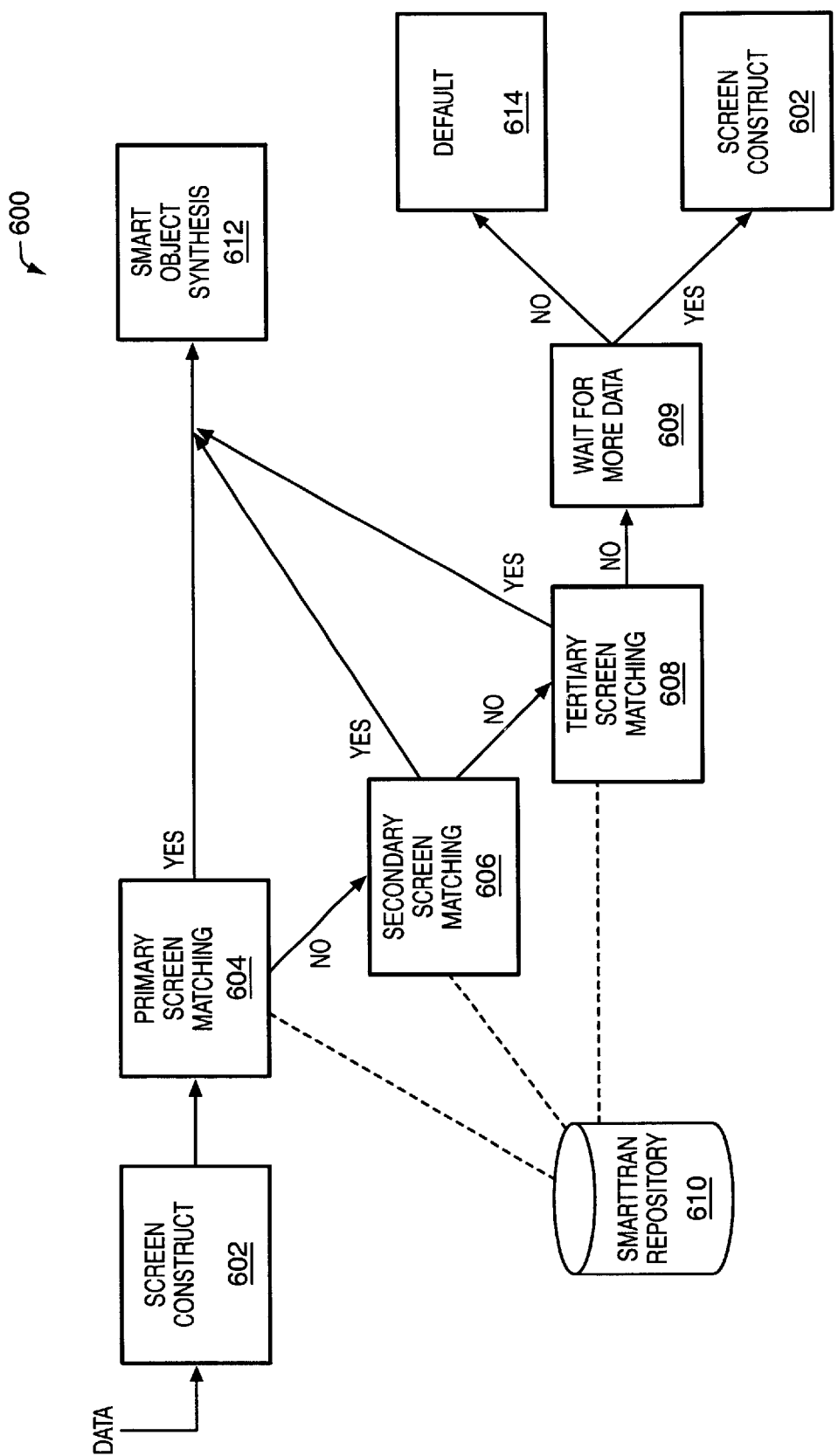
FIG. 6 is a state diagram that illustrates the state transitions within the adaptive event analyzer process, according to one embodiment of the present invention.

FIG. 6 is a state diagram that illustrates the state transitions within the adaptive event analyzer process, according to one embodiment of the present invention. Data from the host application is written into screen construct 602. In one embodiment of the present invention, the 3270 write command writes data into a specified buffer location without erasing or modifying data in the other locations. To mimic the 3270 screen buffer, the SmartTran program data stream object also has a buffer. When a data stream of the 3270 write command is used to create a SmartTran screen object, the data in the data stream is mixed into a buffer of the data stream object that mimics the 3270 screen buffer. The screen object is then created based upon the data in the buffer.

From the screen construct 602, the data stream is then input through the three-level matching algorithm to identify the screen. The three-level matching algorithm comprises the primary screen matching 604, the secondary screen matching 606, and the tertiary screen matching 608 levels. Screen data from each of the matching levels is stored in SmartTran repository 610. If any of the screens result in a match at any of the three levels, the run-time server process enters the smart object synthesis phase 612, which is described in greater detail below. If, however, none of the screens result in a match at any of the three levels, the run-time server process waits for more data 609 and enters a default automatic object synthesis process 614 if there is no more data. If there is more data the process proceeds from the screen construct 602.

In one embodiment of the present invention, the automatic object synthesis process 614 takes screen fields from screen construct 602 and translates them into page objects by applying pre-defined default translation rules. Because of the asynchronous nature of mainframe applications, additional screen elements may be added in separate data buffers. In one embodiment of the invention, prior to generating a default web page, the SmartTran program waits for a short tunable time period to determine if more screen fields appear. If more data is provided to define the screen fields this data is input to the screen construct 602 and the three-level matching algorithm is then performed on the new data to attempt a match.

Smart Object Synthesis

During the development phase, the SmartTran builder component 404 is used to customize page layouts. In one embodiment of the present invention, during run-time, a SmartTran synthesis operation executed by the run-time server 406 combines the application run-time data stream data into its associated user customized page. The smart object synthesis operation 412 includes the two primary steps of identifying the data stream and mixed data stream with its associated host screen, and merging the run-time data with a customized page template. The merge operation is also a two-step process that includes a host screen merge function and a page merge function.

In one embodiment of the present invention, the host screen merge function acts to merge screen objects created as SmartLinks. A run-time 3270 data stream is merged with a repository-based host screen object based on the location and size the object. For example, if there is a web object built from a screen element from the matched screen whose address is in row 3, column 8 of size 20, then the merge operation will retrieve 20 characters from the data stream buffer in the same location and replace the object contents with the run-time data. A web object will be removed if there is no corresponding content in the data stream for which a field in a matching screen template is defined. Similarly, an object can be created if there is new run-time data that does not have its corresponding customized part. In this case, object deletion and creation information is passed from the host screen merge function to the page merge function.

In one embodiment of the present invention, a page merge function follows the host screen merge function. SmartTran page and screen objects are closely related to each other as many objects in a page are created from screen objects. After a screen merge function is performed, a page merge operation is performed to group associated screens into a corresponding page and guard the integrity between the page and its associated screens.

Despite object deletion and creation, objects can be expanded or combined. For the example given above, if the run-time length of the contents of the text object is greater then 20 (e.g., 26), the object will be expanded if there is no object in the region from row 3, column 28 to row 3, column 34; otherwise the object will be combined with the overlapped object.

SmartTran converts a data stream of a host screen into objects that can be customized through SmartTran builder. At run-time, different host screens must be recognized, and the data streams mixed into page objects. In this manner, the run-time screen information is combined with customized information associated with the screen.

In one embodiment of the present invention, the mixing operation uses the SmartTran data stream object buffer. When a data stream is used to create a SmartTran screen object, the data in the data stream is mixed into the buffer of the data stream object, and the screen object will then be created based upon the data in the buffer.

Depending on the composition of the host application being used to create the corresponding web-based application, various merge operations may be performed by the smart object synthesis operation in the run-time server. The SmartTran program allows individual data elements from any combination of host screens to be mapped for delivery by a single web page. Thus, the various merge operations include one-to-one page object synthesis and many-to-one page object synthesis. Different types of data elements may also be merged, thus the merge operations may also include hyperlink page object synthesis, and data table page object synthesis.

FIG. 7A is a state diagram that illustrates the state transitions of the smart object synthesis function for one-to-one page object synthesis, according to one embodiment of the present invention. Screen object merging function 702 is followed by page object merging function 704. The resulting page comprising the merged screens is displayed on the network client by a web page generation function 706. If more data is to be combined with the merged page, the run-time server executes the adaptive event analyzer process 708 to perform the matching algorithm to construct the corresponding web-page screen.

FIG. 7B is a state diagram that illustrates the state transitions of the smart object synthesis function for many-to-one page object synthesis, according to one embodiment of the present invention. Screen object merging function 710 is followed by page object merging function 712. If the resulting page comprising the merged screens includes the final screen in the host application, the resulting screen is displayed on the network client by a web page generation function 714. If it does not include the final screen, a transition to the next screen is executed, 716. As described previously, a transition is partly defined by two screens, one of which transitions to the other under mainframe application control based on end-user input and database values. A transition is recorded in the repository as the user data required to drive a mainframe application state through the transition. Upon execution of the transition, screen and page merging functions of the smart object synthesis operation 718 are performed. If more data is to be combined with the merged page, the run-time server executes the adaptive event analyzer process 708 to perform the matching algorithm to construct the corresponding web-page screen. Alternatively, an automatic synthesis function 722 may be performed that takes screen objects and translates them into page objects by applying pre-defined default translation rules.

Figure 7C:
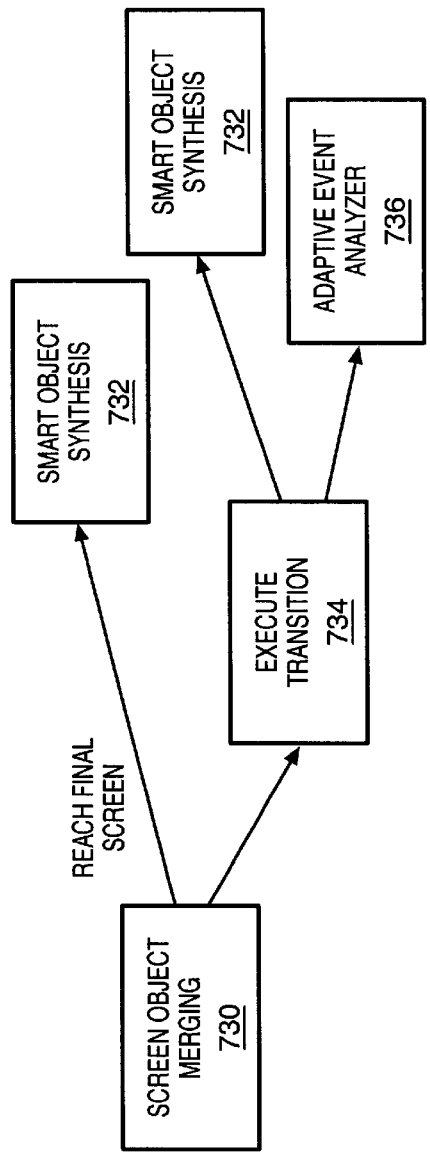
FIG. 7C is a state diagram that illustrates the state transitions of the smart object synthesis function for hyperlink page object synthesis, according to one embodiment of the present invention.

FIG. 7C is a state diagram that illustrates the state transitions of the smart object synthesis function for hyperlink page object synthesis, according to one embodiment of the present invention. Screen object merging function 730 merges the hyperlink transitions in the host application screens. If the resulting page comprising includes the final screen in the host application, the resulting screen is displayed on the network client by a web page generation function 732. If it does not include the final screen, a transition to the next screen is executed, 734. Upon execution of the transition, screen and page merging functions of the smart object synthesis operation 732 are performed. If more data is to be combined with the merged page, the run-time server executes the adaptive event analyzer process 736 to perform the matching algorithm to construct the corresponding web-page screen.

Figure 7D:
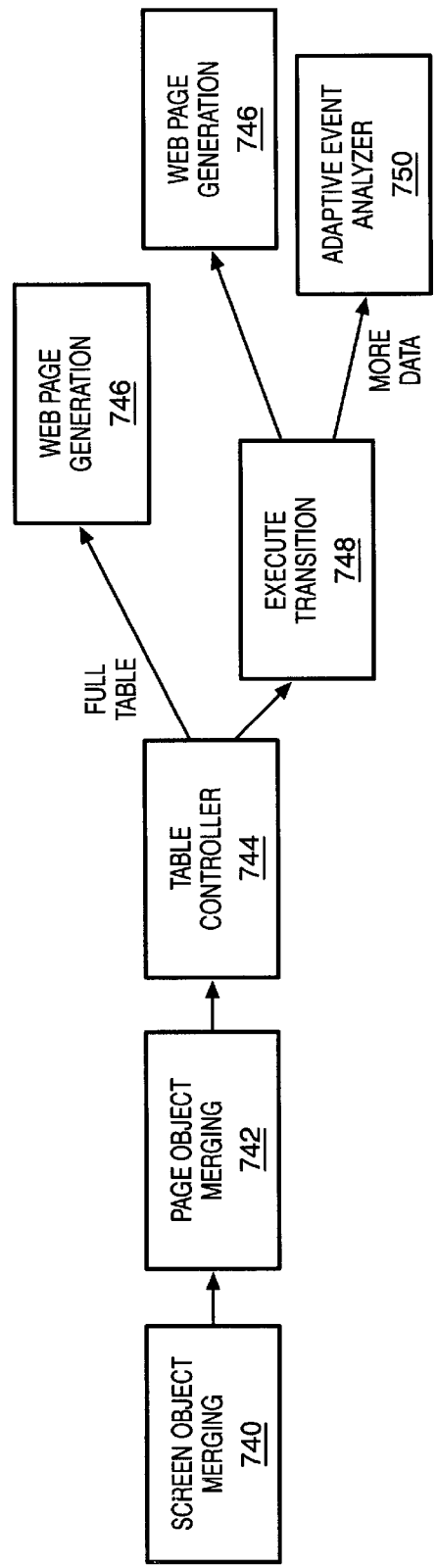
FIG. 7D is a state diagram that illustrates the state transitions of the smart object synthesis function for data table page object synthesis, according to one embodiment of the present invention.

FIG. 7D is a state diagram that illustrates the state transitions of the smart object synthesis function for data table page object synthesis, according to one embodiment of the present invention. Screen object merging function 740 is followed by page object merging function 742. The merged page is then processed by table controller 744. If the resulting page comprising the merged screens includes the final screen in the host application, the resulting screen is displayed on the network client by a web page generation function 746. If it does not include the final screen, a transition to the next screen is executed, 748. Upon execution of the transition, the resulting screen is displayed on the network client by a web page generation function 746. If more data is to be combined with the merged page, the run-time server executes the adaptive event analyzer process 750 to perform the matching algorithm to construct the corresponding web-page screen.

Automatic HTML 2D Layout

In one embodiment of the present invention, an automatic Hypertext Markup Language (HTML) two-dimensional (2D) layout program places the merged objects in the final web page. The HTML 2D layout program performs several different layout functions including, automatic positioning of an object in two dimensional space in HTML, dynamic generation of HTML code supporting 2D layout, support for a visual editor (SmartBuilder) to enable the user to position objects in two dimensional space, and the generation of browser specific HTML code for 2D layout.

In one embodiment of the present invention, the user positions objects through use of a visual editing tool (SmartBuilder). The SmartTran program then generates HTML code containing browser specific 2D layout information. For web browsers that support tables, SmartTran generates an HTML TABLE whose cells are used for positioning. For web browsers that do not support tables, preformatted HTML code is generated (e.g., using the PRE tag). SmartTran is also capable of generating alternative markup languages for other browsers, e.g., it generates HTML for handheld (phone) devices.

For horizontal object positioning, SmartTran examines the objects in a page, determines each unique column position of the objects on the page, and then generates a table whose cells contain the objects in the page. The columns in this "layout" table are assigned width values (as a percentage of the table width) so that the horizontal positions of objects in the Web browser mimic, as closely as possible, the horizontal placement of the objects in the visual editor (SmartBuilder). Horizontal placement takes into account objects that span multiple rows, generating "filler" cells to the left and right of multiple row objects which lie to the left of an object to be positioned.

For vertical object positioning, SmartTran determines vertical layout on a row by row basis, and then inserts objects in separate rows in a "layout" table and generates empty rows in the table so that the vertical positions of objects in the Web browser mimic, as closely as possible, the vertical placement of the objects in the visual editor (SmartBuilder).

Figure 8:
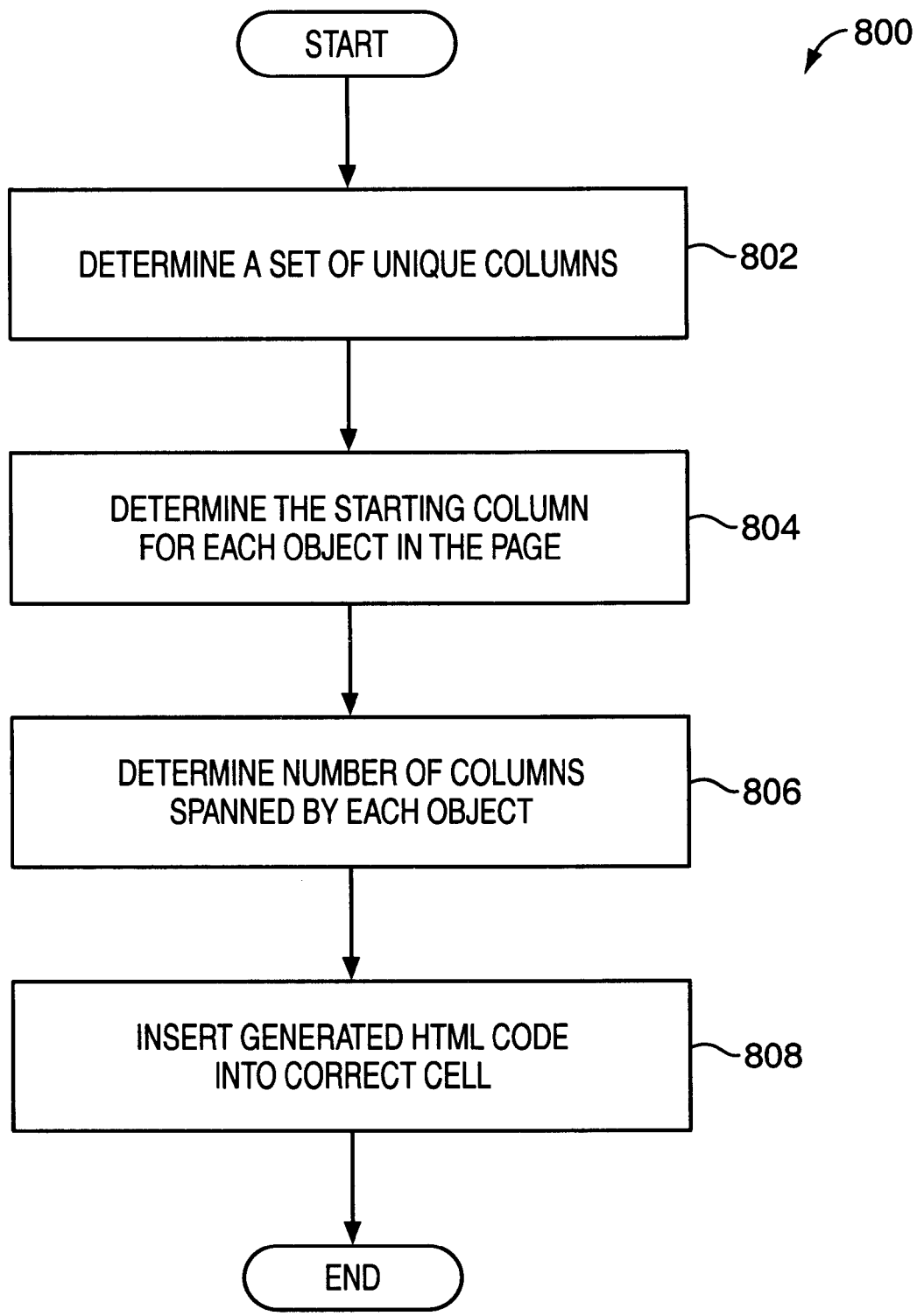
FIG. 8 is a flowchart that illustrates the steps of generating a two-dimensional HTML page, according to one embodiment of the following invention.

FIG. 8 is a flowchart that illustrates the steps of generating a two-dimensional HTML page, according to one embodiment of the following invention. For the embodiment illustrated in FIG. 8, it is assumed that the web browser supports table structures, in which HTML tables are generated for layout. In flowchart 800, the automatic HTML 2D layout mechanism performs the specified steps.

For an object in a page, a set of unique columns is first determined, step 802. In one embodiment, this set of unique columns is defined by the left edges of the objects in the page. In step 804, the starting (left most) column for each object in the page is determined. For each object, the number of columns that the object spans is then determined, step 806. Appropriate HTML code is generated for each object in the page, and, in step 808, the generated HTML code for the object is inserted into the correct cell in the layout table, spanning the correct number of columns as determined in step 806. At this point the process ends.

In one embodiment of the present invention, automatic layout can be overcome by a user placing an object in the page and marking the alignment of that object as LEFT, CENTER, or RIGHT.

Application Transformation Method

Figure 9:
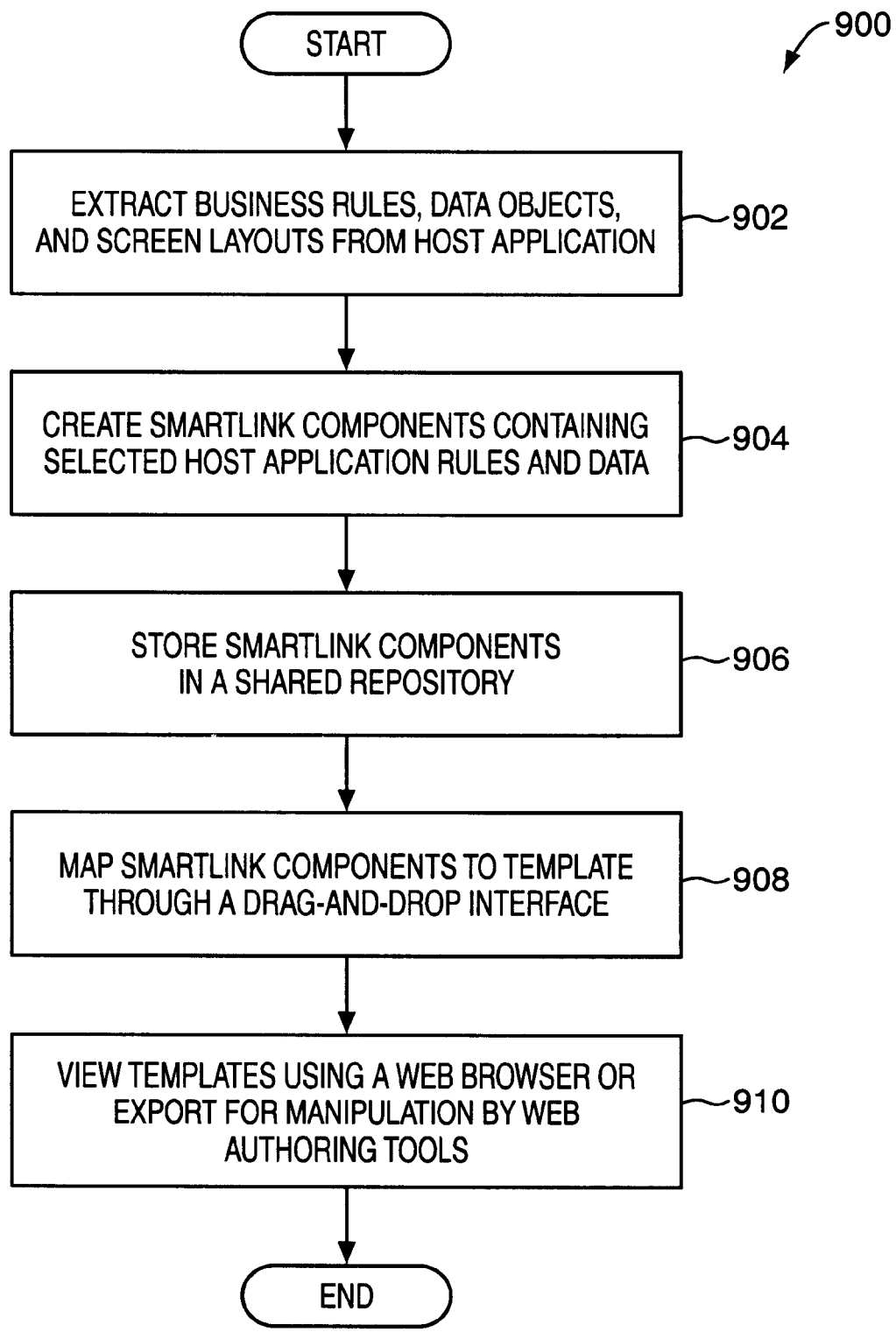
FIG. 9 illustrates the steps performed in the development phase of the host to web-based application transformation, according to one embodiment of the present invention.

FIG. 9 is a flowchart that illustrates the steps of transforming a host application on a mainframe to a web-based application for access by a network client. Flowchart 900 of FIG. 9 illustrates the steps involved in the development phase of the host to web-based application transformation, according to one embodiment of the present invention. In step 902, the relevant business rules, data objects, and screen layouts are extracted from the host application. FIG. 11 illustrates example host screens and their associated sequences, business rules and data. Mainframe screens such as screens 1102 and 1104 in FIG. 11 are often referred to as "green screens" since they are often displayed with green text on a black background.

After the data and rule information is extracted, SmartLink components containing the selected host application rules and data are then created, step 904. In step 906, the SmartLink components are stored in a shared repository. In one embodiment of the present invention, steps 902 to 906 of flowchart 900 are performed by the loader program 402, illustrated in FIG. 4.

Figure 12:
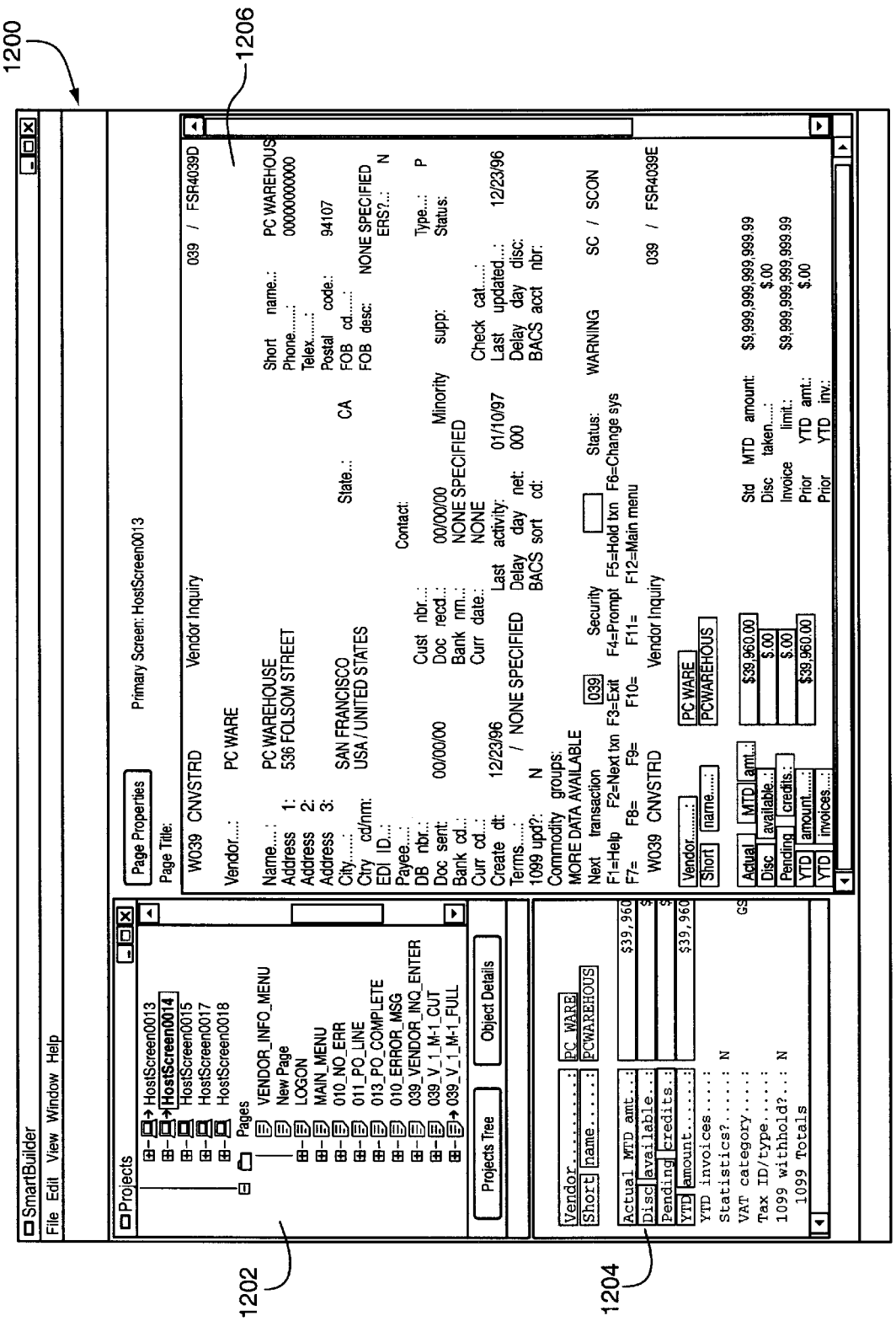
FIG. 12 illustrates an example of a mapping of data objects from the host screens of FIG. 11 to a default web page layout, according to one embodiment of the present invention.

In step 908, the SmartLink components are mapped to web-browser defined templates. In one embodiment of the present invention, a drag-and-drop interface is provided to easily allow a user to manipulate the SmartLink components and place them in a two-dimensional space. After the templates have been created, they may be viewed by a web browser program, or exported for manipulation by web authoring tools, step 910. In one embodiment of the present invention, step 908 of flowchart 900 is performed by the builder program 404, illustrated in FIG. 4. FIG. 12 illustrates an example of a mapping of data objects from the host screens of FIG. 11 to a default web page layout, according to one embodiment of the present invention. Window 1200 represents the graphical user interface for a web browser. Window 1200 includes a root directory window 1202 that provides a tree structured graphical representation of the location of the files as stored on the hard disk or other mass storage device. Window 1204 is a window that provides a display of portions of the host screen window being mapped. Window 1206 displays the default web page into which the host window objects are being mapped.

Figure 13:
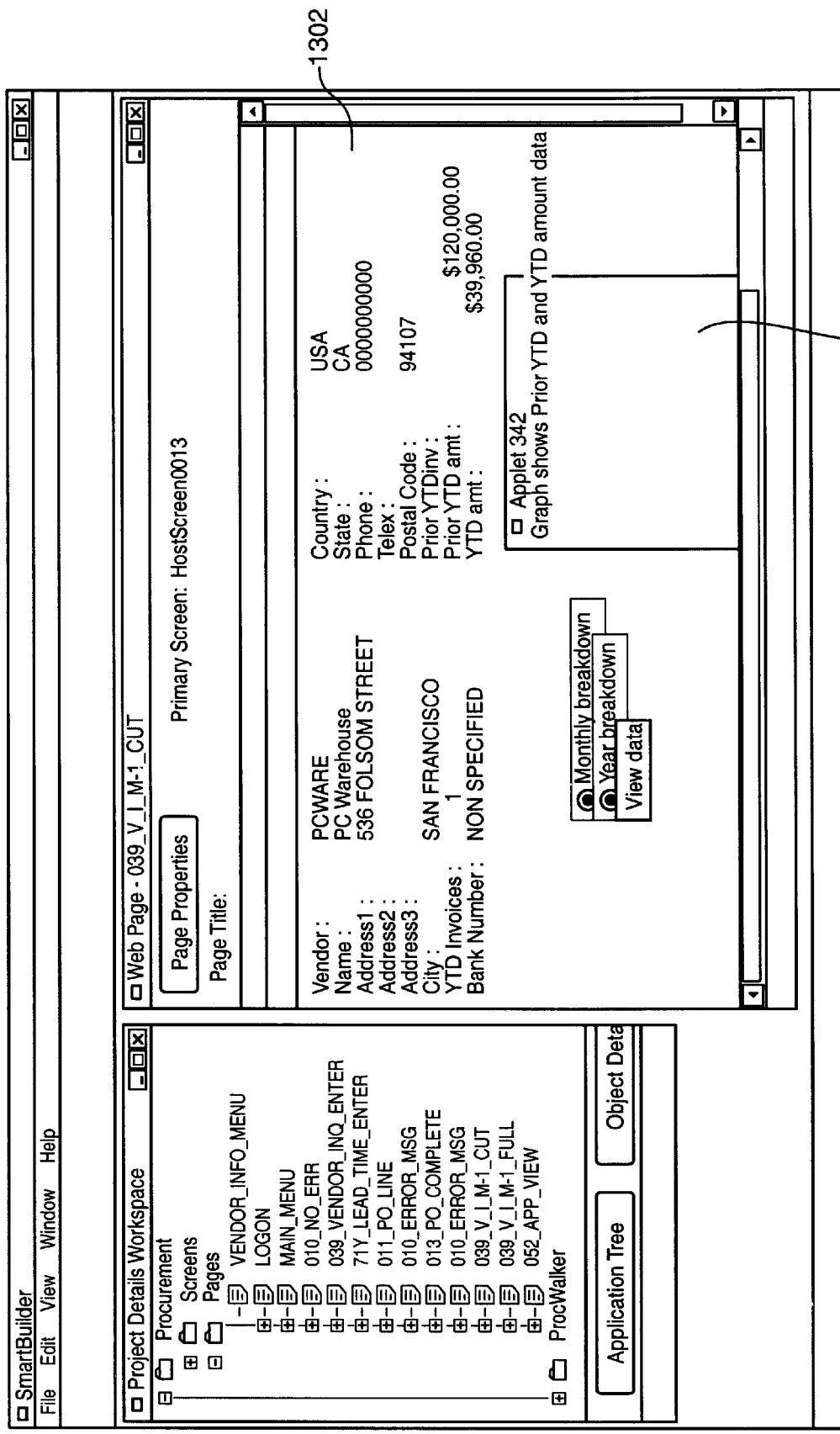
FIG. 13 illustrates a mapped host screen of FIG. 11 displayed through the web authoring environment of the SmartTran program, according to one embodiment of the present invention.
Figure 14:
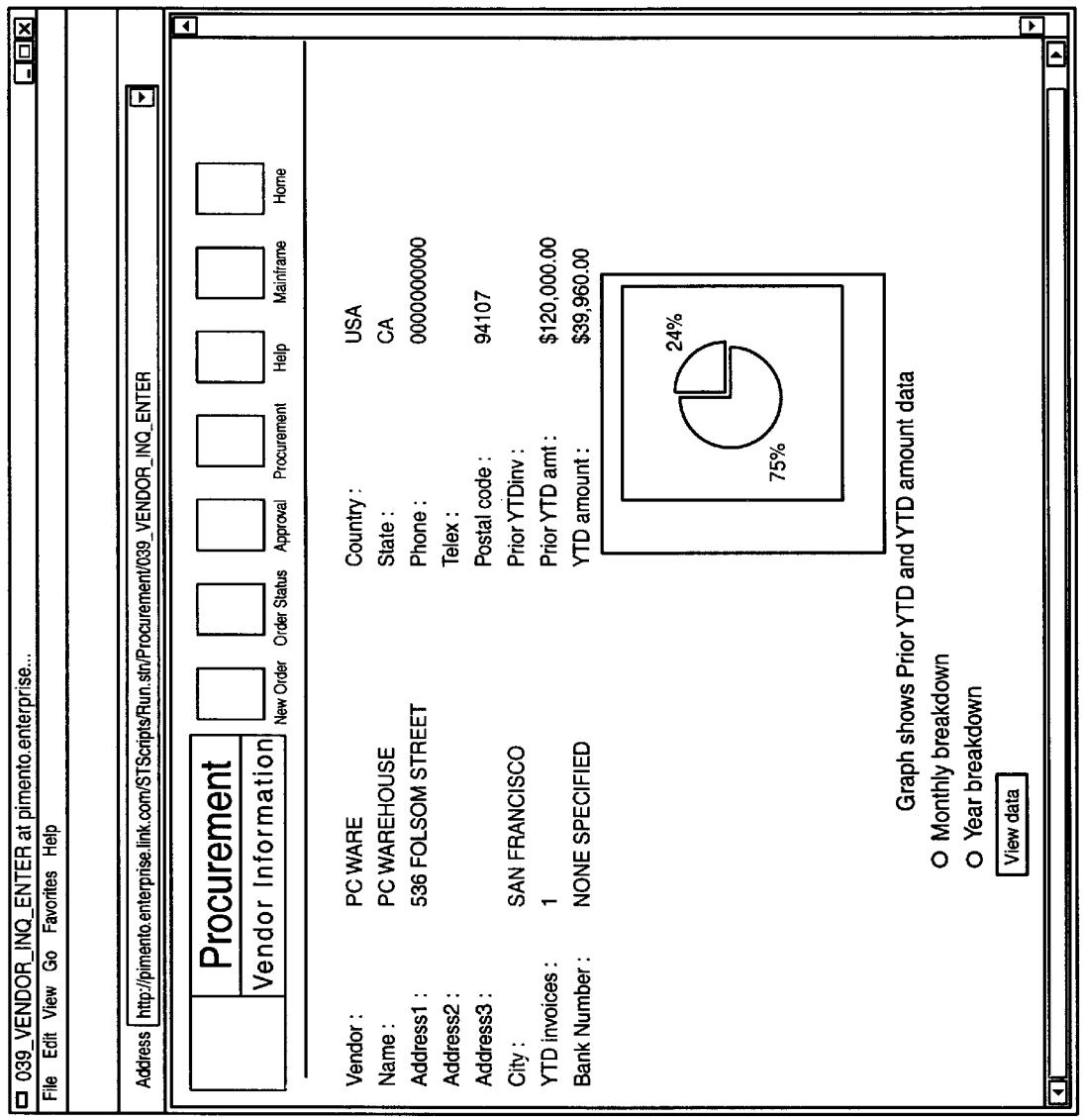
FIG. 14 illustrates an example of a final web page for the mapped host screens of FIG. 11.

In one embodiment of the present invention, the SmartTran program includes a web authoring environment that allows a user to construct full-featured web pages that can incorporate web extensions to the host application. FIG. 13 illustrates a mapped host screen of FIG. 11 displayed through the web authoring environment of the SmartTran program, according to one embodiment of the present invention. Window 1302 is the default web page containing a portion of a mapped host screen of FIG. 11. Window 1304 represents a Java applet that is to be incorporated into the final web page corresponding to the host screen. FIG. 14 illustrates an example of a final web page for the mapped host screen of FIG. 11. The final web page 1400 provides a web interface into the existing host screens of FIG. 11, and their associated business rules and logic.

Figure 15:
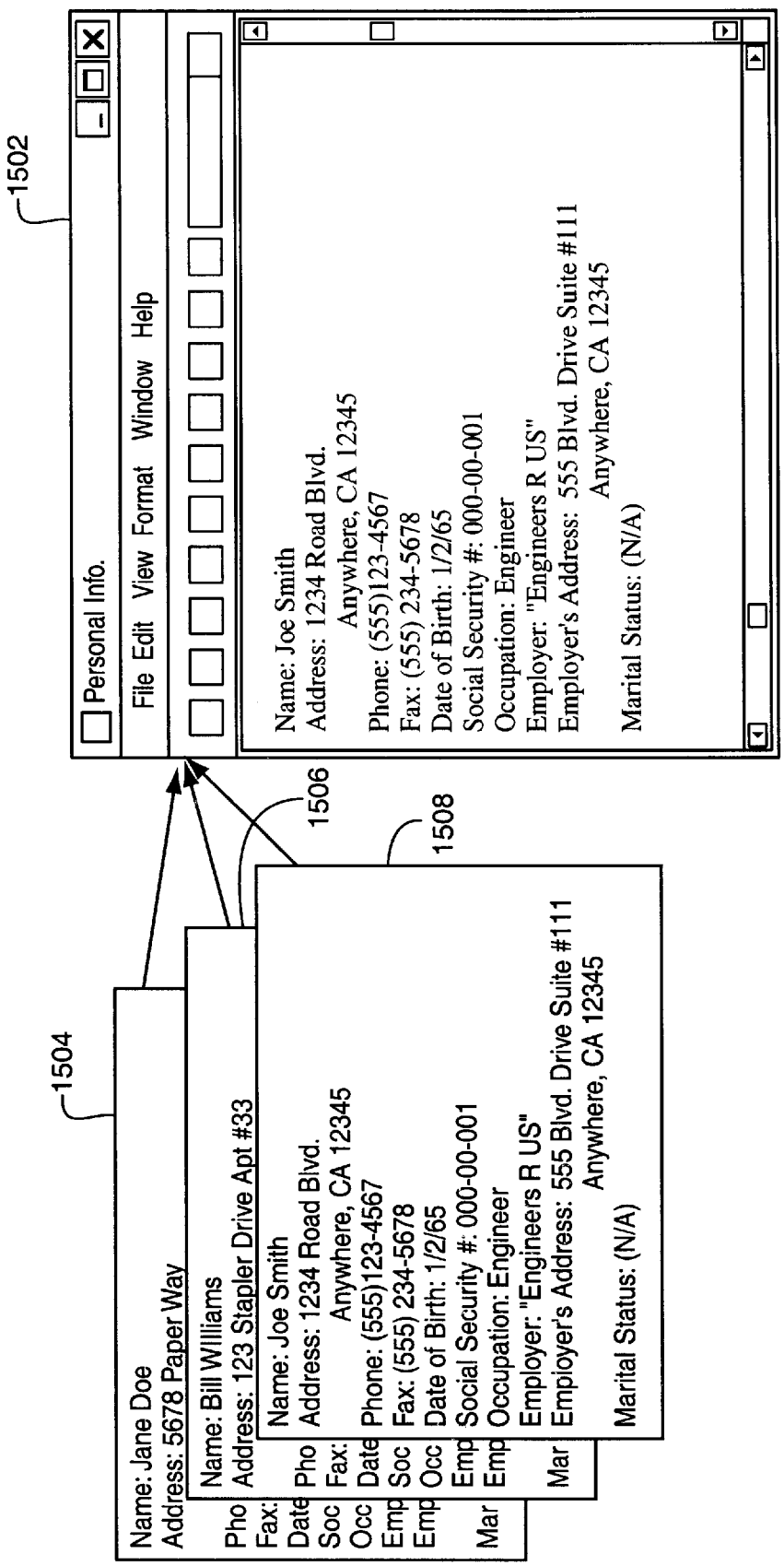
FIG. 15 illustrates multiple host screens mapped into a single web page using embodiments of the present invention.

In one. embodiment of the present invention, multiple host screens can be combined on a single web page to provide users with access to the information contained in the host application. FIG. 15 illustrates multiple host screens mapped into a single web page using embodiments of the present invention. Host screens 1504, 1506, and 1508 each contain different data pertaining to different individuals. These three pages are mapped into a single web page 1502. The data contained in the three host screens is displayed in the standard format utilized by the web browser on the network client, and the mapped data can be navigated using the tools of the web browser.

The development phase process illustrated in FIG. 9 defines the steps involved in developing a web-based application from a host application. Once the application has been so developed it is executed by the run-time server process 406 on the web front-end processor 308. The run-time server process 406 acts as a run-time engine that dynamically generates web pages by selecting the appropriate templates based on a user's requests and integrating the host application data and rules.

Figure 10:
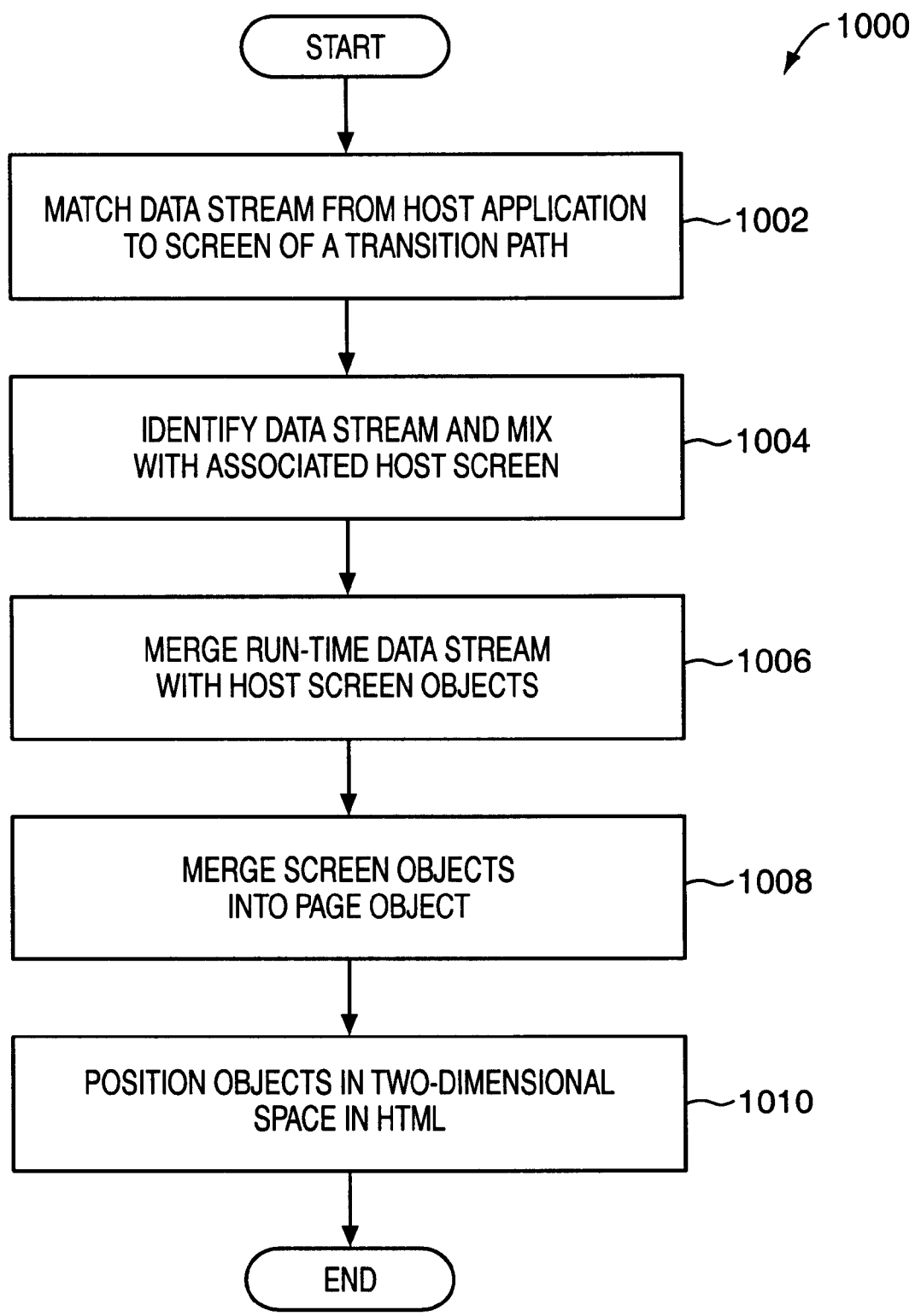
FIG. 10 is a flowchart that illustrates the steps performed by the run-time server during the accessing of a transformed host application through a web browser, according to one embodiment of the present invention.

FIG. 10 is a flowchart that illustrates the steps performed by the run-time server during the accessing of a transformed host application through a web browser, according to one embodiment of the present invention. In step 1002, a data stream from the host application is matched to a screen of a transition path. In one embodiment, this step is performed by the adaptive event analyzer process 410 and uses the three level matching algorithm described previously. In step 1004 the data stream is identified and the data is mixed with an associated host screen. The run-time data is then merged with host screen objects, step 1006. The resulting screen objects are then merged into a page object, step 1008. In one embodiment, steps 1004 to 1008 are performed by the smart object synthesis process 412. In step 1010, the objects are positioned in the final web page defined as HTML objects in two-dimensional space. In one embodiment, step 1010 is performed by the two-dimensional HTML layout process 414. At this point the run-time process ends.

The development phase and run-time phase architecture of the SmartTran program allows a business organization to control the distribution and processing of web applications by determining where and how a web front-end processor will be deployed. For example, different web front-end processors can be used to service different applications, different sets of users, or to segment Internet from Intranet users and data. Web front-end processors can reside within a central location of the business, or as remote processors within various departments or diverse geographic locations. SmartTran web front-end processors process component integration and delivery, rather than the actual business rules. With this approach, the original business rules continue to be processed on mainframe or client/server systems, ensuring the integrity of applications and data.

The SmartTran program is an open environment that integrates transparently with Java applets, ActiveX plug-ins and HTML pages developed using popular Internet authoring tools. Consequently, developers can take advantage of the power of SmartTran while continuing to use familiar tools. SmartTran provides the same look and feel as other tools that run on popular personal computer operating systems, thus allowing web authors to be trained in a relatively short period of time.

In the foregoing, a system has been described for transforming mainframe applications into corresponding web-based applications. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A computer-implemented method for transforming data in a first computer program for use by a second computer program, said first computer application residing on a first computer and said second computer program being executed by a second computer, said first and said second computer being coupled to each other through a network, said method comprising the steps of:

extracting a set of logic rules and a set of data from said first computer program, data in said first computer program being represented as either host data screens, message buffers, or objects and methods;

creating link objects containing said set of logic rules and said set of data, said link objects pointing to locations storing corresponding data in said first computer program;

mapping said link objects to display regions defined by said second computer program, said second computer program being a web browser program;

storing said link objects in memory prior to said mapping step; and modifying one or more data elements of said set of data through said web browser program, modifying one or more data elements comprising:

matching a host application data for said first computer program with a web object for said second computer program, said host application data comprising data required to construct said web object, said matching comprising a three-level matching algorithm for matching said host application data, said three-level matching algorithm comprising:

a first match result for substantially identical correlation between said host application data and said web object, a second match result for correlation between said host application data and said web object above a first threshold, and a third match result for correlation between said host application data and said web object below said first threshold and between said host application data and a previous web object above a second threshold, merging said host application data with one or more data objects stored in said memory;

combining screen data objects produced by said merging step to produce a page object, and positioning said screen data objects and said page object in a web page displayed by said web browser using hypertext markup language objects.

2. The method according to claim 1 wherein said second computer program is a downstream Internet application.

3. The method of claim 2 further comprising the step of modifying one or more data elements of said set of data through said downstream Internet application.

* * * * *

UNITED STATES PATENT AND TRADEMARK OFFICE
CERTIFICATE OF CORRECTION

PATENT NO.      : 6,510,468 B1
DATED           : January 21, 2003
INVENTOR(S)     : Haynie It is certified that error appears in the above-identified patent and that said Letters Patent is hereby corrected as shown below:

<u>Title page,</u>
Item [75], Inventor, please delete "Mark N. Hayne" and substitute in place thereof
-- Mark N. Haynie --

Signed and Sealed this

Tenth Day of June, 2003

JAMES E. ROGAN
*Director of the United States Patent and Trademark Office*